(12) United States Patent
Sato et al.

(10) Patent No.: US 6,757,871 B1
(45) Date of Patent: Jun. 29, 2004

(54) COMMON DOCUMENT EDITING APPARATUS

(75) Inventors: Chihiro Sato, Nakai-machi (JP); Hiroshi Katsurabayashi, Nakai-machi (JP); Takashi Noguchi, Nakai-machi (JP); Akira Kurosawa, Nakai-machi (JP); Nobuyuki Takeo, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 813 days.

(21) Appl. No.: 09/586,990

(22) Filed: Jun. 5, 2000

(30) Foreign Application Priority Data

Aug. 10, 1999 (JP) .......................................... 11-226520

(51) Int. Cl.[7] .......................... G06F 17/24; G06F 17/30; G06F 12/00; G06F 15/16; G06F 15/167
(52) U.S. Cl. .......................... 715/530; 707/8; 707/200; 707/202; 707/203; 707/204; 707/205; 719/210; 719/214; 719/229
(58) Field of Search .......................... 715/530; 707/200, 707/202, 203, 204, 205, 8; 709/210, 214, 229

(56) References Cited

U.S. PATENT DOCUMENTS 5,835,601 A * 11/1998 Shimbo et al. ............. 715/530
5,870,764 A * 2/1999 Lo et al. ..................... 707/203
6,192,408 B1 * 2/2001 Vahalia et al. ............. 709/229
6,446,093 B2 * 9/2002 Tabuchi ...................... 715/530

FOREIGN PATENT DOCUMENTS

JP    0200105195 A  *  2/2001  ........... G06F/17/24

* cited by examiner

Primary Examiner—Joseph Feild
Assistant Examiner—Chau Nguyen
(74) Attorney, Agent, or Firm—Oliff & Berridge, PLC

(57) ABSTRACT

The invention provides a common document editing apparatus that is capable of reflecting the edition content based on a exclusive edition right on a common document even in the case where the exclusive edition right is cancelled forcibly. When an exclusive edition right of a common document stored in a document storing unit is requested, a lock information managing unit issues an exclusive edition right to permit exclusive edition and the lock information in stored in a lock information storing unit. Upon receiving the edition content together with the lock information, the lock information managing unit stores the edition content in the document storing unit only when the received lock information is identical with the lock information stored in the lock information storing unit. When the exclusive edition right is cancelled forcibly, the lock information managing unit 23 stores the lock information in an unlocked lock information storing unit. When the edition content that is identical with the same lock information is requested to be stored before a new exclusive edition right of the same document is requested, the lock information is overwritten in the document storing unit.

9 Claims, 3 Drawing Sheets

COMMON DOCUMENT EDITING APPARATUS

BACKGROUND OF THE INVENTION

1. Field of the Invention

This invention relates to a document editing apparatus used for editing work in which plural users are involved in edition of plural electronic documents, and more particularly relates to a common document editing apparatus that is capable of reflecting the edition content on the common document based on the exclusive edition right even in the case where the state in which the exclusive edition right for exclusively editing a common document is given to a certain user is canceled forcibly.

2. Description of the Related Art

The common document edition apparatus has been known as the apparatus used for the edition work in which a document is prepared from electronic data and the document is edited by plural users (workers).

A common document editing apparatus as described hereinabove is provided with, for example, a client server system. A common document managed by a server apparatus is edited by plural users who operate their client apparatuses.

In the case of such common document editing apparatus, when plural users simultaneously edit the same common document (the term "documents" includes the page unit document in the present specification), the conformity of the description content of the common document is destroyed. To avoid such a problem, the exclusive edition control for allowing only the user to whom the exclusive edition right is given to edit the common document corresponding to the right is employed.

A common document editing apparatus provided with a client apparatus used for editing by means of user operation and an exclusive edition control server apparatus is exemplified for description.

First, when a client apparatus A starts exclusive edition to edit a common document as shown in FIG. 3A, the client apparatus A requests acquisition of an exclusive edition right to a server apparatus. If an exclusive edition right of the common document specified in the request has not already been acquired by another client apparatus, the server apparatus locks the common document to prohibit edition by another user and issues the exclusive edition right A of the requested common document as shown in FIG. 3B. When the exclusive edition right A is issued, a common document name to which the exclusive edition right A has been issued and a lock ID for specifying the exclusive edition right A are recorded in the server apparatus (lock information storing unit) as lock information A.

The lock ID is a unique ID in the server apparatus, and the lock ID is transmitted to the client apparatus together with the exclusive edition right A and the specified common document for editing.

The user to whom the exclusive edition right has been given edits the common document and stores (write) the edited common document in the server apparatus. Thereby, the edition content is reflected on the common document.

At that time, the lock information of the exclusive edition right given together with the edition content is transmitted to the server apparatus, and after the server apparatus identifies the lock information transmitted from the client apparatus as the lock information A stored in the lock information storing unit of the server apparatus, the server apparatus stores the edition content.

After completion of edition work as described hereinabove, the client apparatus cancels the exclusive edition right and the lock of the common document is unlocked on the server apparatus. The client apparatus transmits the lock information to the server apparatus together with the end information of the exclusive edition. The server apparatus deletes the lock information from the lock information storing unit, and becomes ready for receiving a new exclusive edition right acquisition request on the common document.

In the exclusive edition control as described hereinabove, for example, if the lock on the server apparatus remains unlocked due to hung-up of the client apparatus, the common document cannot be edited afterward.

To avoid such a problem, a mechanism to unlock the lock of the common document forcibly is provided, and if the lock of the common document remains unlocked continuously though the client apparatus to which an exclusive edition right A has been given has finished the edition, as shown in FIG. 4A, the mechanism deletes the lock information A stored in the server apparatus when another client apparatus B requests an exclusive edition right deletion request on the common document, and the client apparatus becomes thereby ready for receiving a new exclusive edition right acquisition request.

However, in the case of such a conventional document editing apparatus in which an issued exclusive edition right is canceled forcibly as described hereinabove, another user (client apparatus B) could unlock the lock with inattention while the user (client A) to whom the exclusive edition right has been given is editing as shown in FIG. 4B. Unlocking of the lock on the server apparatus during the edition as described hereinabove results in the situation where the edition content cannot be written and returned to the server apparatus and cannot be reflected on the common document because the corresponding lock information A stored in the server apparatus has already been deleted though the lock information A given to the client apparatus A together with the edition content is transmitted to the server apparatus. As the result, the conformity of the common document is involved in a trouble.

SUMMARY OF THE INVENTION

The present invention has been accomplished to solve the above-mentioned problem, and provides a common document editing apparatus that is capable of reflecting the edition content based on the exclusive edition right on the common document within a range without hindrance even though the exclusive edition right is canceled forcibly to thereby maintain the conformity of the common document.

Furthermore, the present invention provides a common document editing apparatus that is suitable for a system used for cooperatively editing a common document by means of a client server system.

A document editing apparatus in accordance with the present invention controls exclusive edition of a common document as described hereunder.

First, when the exclusive edition right of the common document stored in a document storing unit is requested by a user, a lock information managing unit issues the exclusive edition right for permitting exclusive edition of the common document in response to the request by the user, and stores lock information for specifying the exclusive edition right issued to the lock information storing unit and the document that is the target of the exclusive edition right.

When the user to whom the exclusive edition right has been given enters the edition content together with the lock information, the lock information managing unit checks the identification with the lock information stored in the lock information storing unit, and overwrites only with the document edited according to the identical exclusive edition right in the document storing unit to thereby allow only the user having the exclusive edition right to edit the common document.

The document editing apparatus in accordance with the present invention functions to forcibly cancel the exclusive edition right as shown hereunder.

The document editing apparatus in accordance with the present invention is provided with an unlocked lock information storing unit for storing the lock information separately from the lock information storing unit. The lock information managing unit functions to cancel the issued exclusive edition right forcibly, transfers the lock information of the exclusive edition right cancelled forcibly when the forcible cancellation is executed to the unlocked lock information storing unit and stores it therein temporarily, and performs overwriting with the edition document to store it in the document storing unit when the document has been edited according to the exclusive edition right, which is identical with the lock information, transferred to the unlocked lock information storing unit is requested to be stored before a new exclusive edition right of the same document is requested.

Even though the lock is unlocked with inattention by another user while the former user to whom the exclusive edition has been given is editing, the former user is allowed to reflect the edition content on the common document because the former user to whom the exclusive edition right has been given can reflect the edition content on the common document without any trouble as long as the former user reflects the edition content before another user acquires the exclusive edition right of the same document. As described hereinabove, the conformity of the common document is maintained.

The document editing apparatus in accordance with the present invention is preferably applied to a system for cooperatively editing the common document by use of a client server system provided with a client apparatus and a server apparatus connected to each other by way of a communication line. The server apparatus is provided with a document storing unit, a lock information managing unit, a lock information storing unit, and an unlocked lock information storing unit, and the client is provided with a document editing unit for issuing the exclusive edition right request that specifies the common document and for editing the common document supplied from the server apparatus.

BRIEF DESCRIPTION OF THE DRAWINGS

A preferred embodiment of the present invention will be described in detail based on the followings, wherein.

DETAILED DESCRIPTION OF PREFERRED EMBODIMENT

One embodiment of the present invention will be described in detail hereinafter with reference to the drawings.

Figure 1:
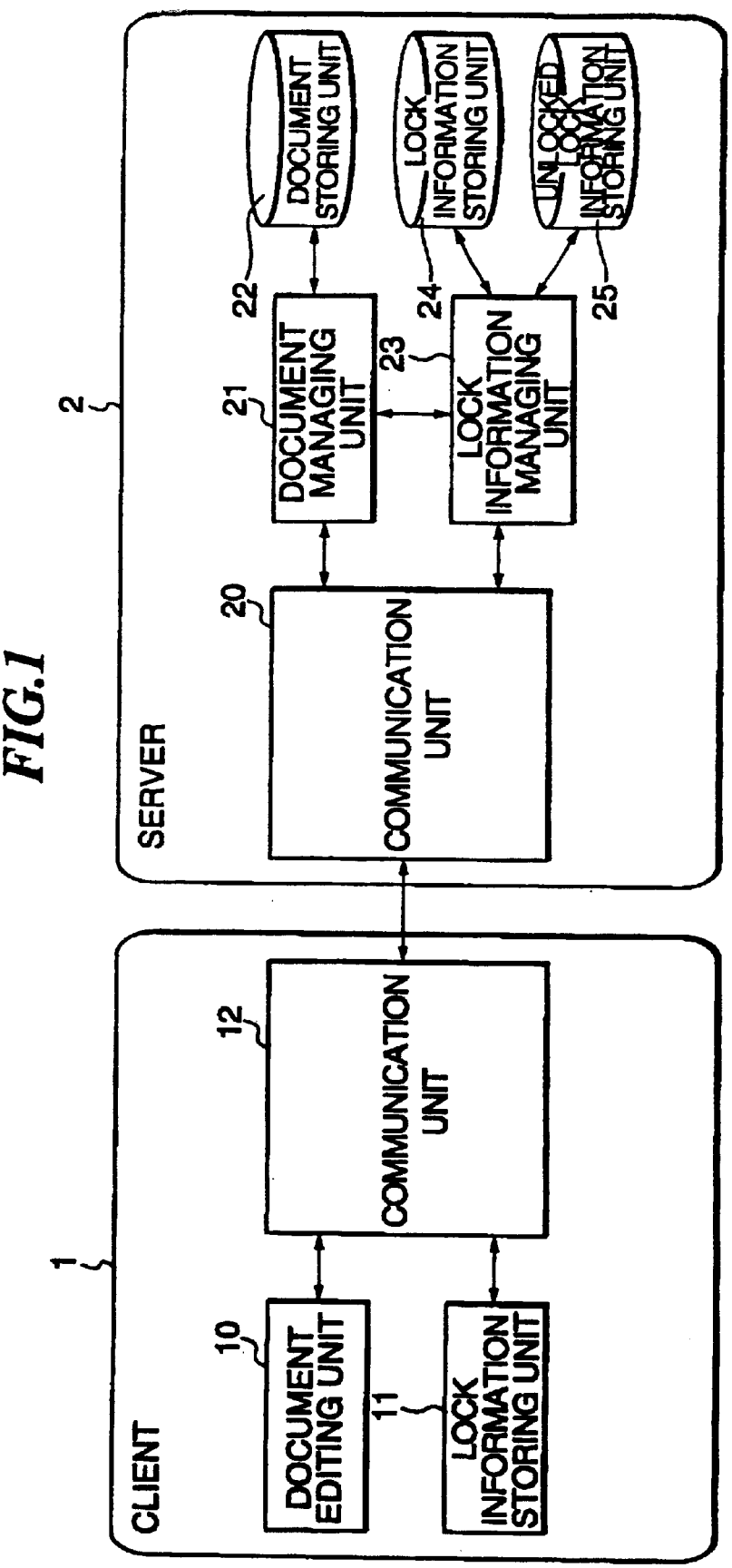
FIG. 1 illustrates a configuration of a document editing apparatus in accordance with one embodiment of the present invention.

FIG. 1 shows the configuration of a document editing apparatus in accordance with the present example, in the embodiment, a client server system is provided with client apparatus 1 and a server apparatus 2 connected to each other by way of a communication line. Plural users who operate their own plural client apparatuses 1A edit cooperatively a common document stored and managed by the server 2 by use of the client server system.

The client apparatus 1 is provided with a document editing unit 10, a lock information storing unit 11, and a communication unit 12, and the server apparatus 2 is provided with a communication unit 20, a document managing unit 21, a document storing unit 22, a lock information managing unit 23, a lock information storing unit 24, and unlocked lock information storing unit 25.

These functional units 10 to 12 and 20 to 25 are implemented by performing a program in accordance with the present invention by use of the resource.

The document editing unit 10 receives a user Input from a keyboard and a mouse and has a screen for displaying a common document to be edited, and functions to edit the description content based on user operation to be performed on a common document displayed on a screen and to transmit the edited content to the server apparatus 2 together with given lock information.

The lock information storing unit 11 is provided with a readable/writable memory, and stores the exclusive edition right (particularly, lock information including document name and lock ID) transmitted from the server apparatus 2.

The client apparatus side communication unit 12 and the server apparatus side communication unit 20 function to receive various requests, common documents to be edited, exclusive edition right, edited document content, and lock information by way of a communication line such as a local network or Internet.

In this example, the document editing apparatus of client server style is constituted, otherwise a document editing apparatus in accordance with the present invention may be constituted with a single computer, in this case, the communication units 12 and 20 for communicating by way of the communication line are omitted.

The document storing unit 22 is provided with a readable/writable memory, and the document storing unit 22 stores common documents.

The document managing unit 21 controls input/output operation of common documents to/from the document storing unit 22, and performs exclusive edition control and forcible cancellation control of the exclusive edition right to thereby control user access to common documents stored in the document storing unit 22.

Each of the lock information storing unit 24 and the unlocked lock information storing unit 25 is provided with a readable/writable memory, the lock information storing unit 24 stores the lock information usually issued in exclusive edition control, on the other hand, the lock information that has been stored in the lock information storing unit 24 is transferred to and stored in the unlocked lock information storing unit 25 when the exclusive edition right is subjected to forcible cancellation control.

The lock information managing unit 23 controls input/output operation of the lock information in/from the lock information storing unit 24 and the unlocked lock information storing unit 25, and checks the identification of the lock information added to the edition content with the lock information stored in these storing units.

Next, an edition process by use of the document editing apparatus having the configuration as described hereinabove will be described.

First, when a user operates the document editing apparatus 10 to transmits a common document specification and exclusive edition right request to the server apparatus 2, the document managing unit 21 of the client apparatus 1 reads out the specified common document from the document storing unit 22. The specified common document is transmitted from the server apparatus 2 to the client apparatus 1 by way of the communication units 12 and 20, and supplied to the document editing unit 10 for edition in the client apparatus 1. If the lock information managing unit 23 of the server apparatus 2 has not issued an exclusive edition right to other users, the lock information managing unit 23 issues an exclusive edition right of the specified common document in response to the received exclusive edition right request. The exclusive edition right is transmitted to the client apparatus 1 together with the above-mentioned common document. The lock information (including the target document name and lock ID for identifying the exclusive edition right) of the issued exclusive edition right is stored in the lock information storing unit 24.

In the client apparatus 1, the lock information storing unit 11 stores the information (lock information included in the information) for specifying the exclusive edition right received together with the common document as the acquisition certificate of the exclusive edition right.

When the user operation on the document editing unit 10 for editing the common document is finished, the lock information stored in the lock information storing unit 11 is added to the edited content and both are transmitted together to the server apparatus 2 by way of the communication units 12 and 20.

Upon receiving the edited content together with the lock information, the lock information managing unit 23 in the server apparatus 2 checks the identification between the received lock information and the lock information stored in the lock information storing unit 24. Only when both lock information are identical, the edited content received by the document managing unit 21 is written over and stored in the document storing unit 22. On the other hand, if both lock information are not identical to each other, the edited content is not stored. As the result, only the user who has the exclusive edition right can edit the common document stored in the document storing unit 22.

When the forcible cancellation of the exclusive edition right is executed by the lock information managing unit 23 in the exclusive edition control, the process as described hereunder is performed.

Figure 2A:
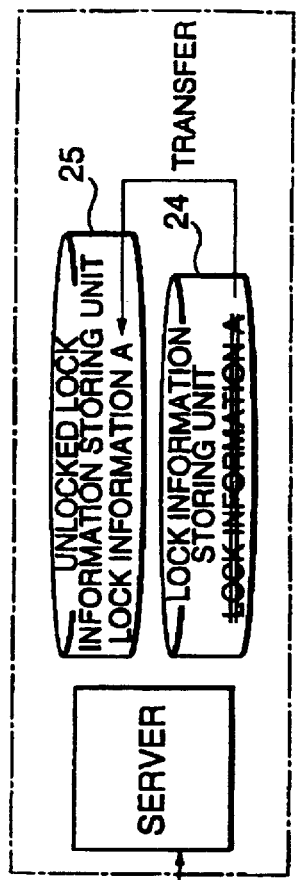
FIG. 2A to FIG. 2C are conceptual diagrams for describing deletion and restoration processes of the exclusive edition right.

For example, when another client apparatus B (another user) requests to delete the exclusive edition right A in the state that the client apparatus A ham the exclusive edition right (lock information A) as shown in FIG. 2A, the lock information managing unit 23 deletes the lock information A stored in the lock information storing unit 24, controls the lock information A so as to be transferred to and stored in the unlocked lock information storing unit 25 to thereby unlock the lock based on the exclusive edition right A.

As described hereinabove, even though the client apparatus A to which the exclusive edition right A is given falls in malfunction due to hung-up, another client apparatus B can peruse the common document.

Figure 2B:
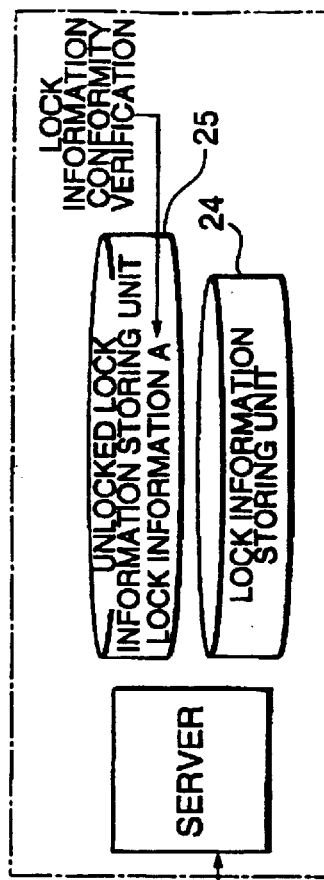

When the former client apparatus A requests the server apparatus to store the edition content including the edited content and the lock information A of the acquisition certificate after the exclusive edition right A is cancelled forcibly as shown in FIG. 2B, the lock information managing unit 23 checks the identification between the lock information A received together with the storage request and the lock information A stored in the unlocked lock information storing unit 25 and performs overwriting with the received edition content received by the document managing unit 21 and stores in the document storing unit 22 based on the identification between both of the lock information on the premise that the exclusive edition right of the common document is not yet given to another client apparatus.

Therefore, the client apparatus A can reflect the edition content on the common document as long as the conformity of the target common document is not destroyed even after the exclusive edition right is cancelled forcibly.

Figure 2C:
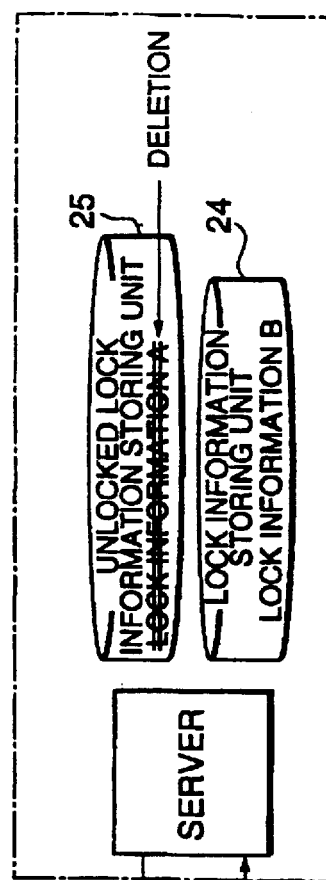
Figure 3A:
FIG. 3A and FIG. 3B are conceptual diagrams for describing exclusive edition control.
Figure 3B:
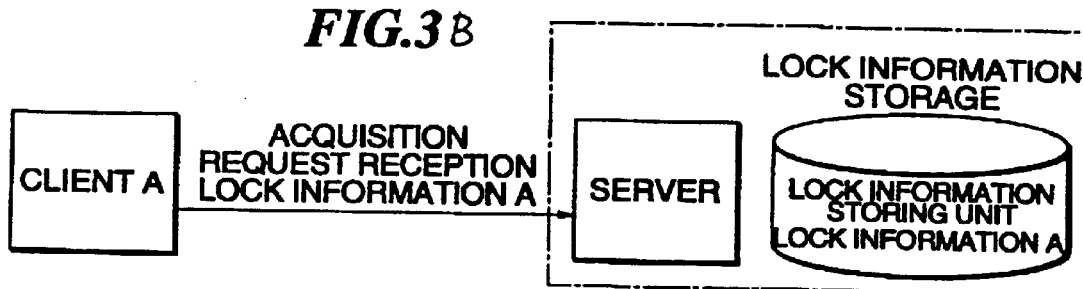
Figure 4A:
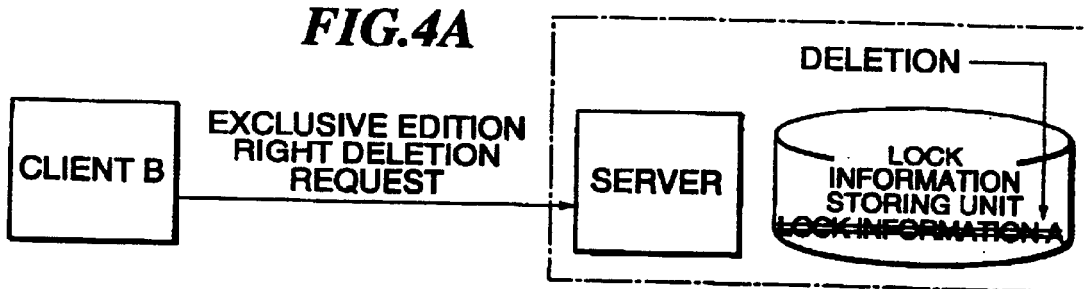
FIG. 4A and FIG. 4B are conceptual diagrams for describing deletion of the exclusive edition right.
Figure 4B:
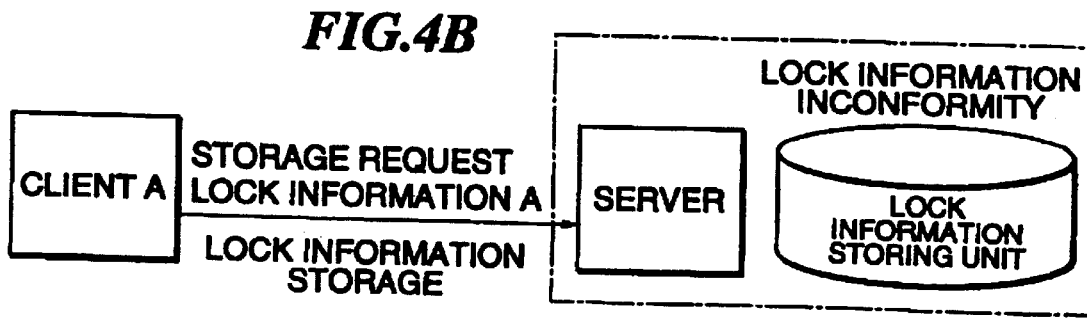

In the case where another client apparatus B requests for the exclusive edition right of the common document as shown in FIG. 2C, the lock information managing unit 23 gives the exclusive edition right to the client, and deletes the former lock information A stored in the unlocked lock information storing unit 25. When the former client apparatus A requests the server apparatus to store the edition content including the edited content and the lock information A of the acquisition certificate after the lock information A is deleted as described hereinabove, because the exclusive edition right of the common document has already been given to another client apparatus B and the lock information A has been deleted, the edition content received together with the storage request is not stored in the document storing unit 22.

As the result, the editions having different contents will not be added to the same common document, and the conformity of a common document is maintained.

In the case where the storage request is received from the former client apparatus A as shown in FIG. 2B, the document is subjected to wiring process if the lock information A remains in the unlocked lock information storing unit 25 even after the exclusive edition right deletion request is received, at that time, whether or not the exclusive edition right itself given to the client apparatus A is restored immediately is determined depending on the setting of the server apparatus. In other words, the exclusive edition right request is invalidated and the exclusive edition right is restored, that is, the lock information of the document may be restored because the client apparatus that has stored the exclusive edition right remains valid. Otherwise, the storage request may be received before a new exclusive edition right acquisition request is issued in the state that the exclusive edition right remains deleted.

As described hereinabove, according to the present invention, in the case where the exclusive edition right of a common document is cancelled with inattention, the cancelled exclusive edition right can be restored and the document is written back without any conflict as long as it is restored before a new exclusive edition right of the same common document is acquired.

Furthermore, according to the present invention, in a system for cooperatively editing a common document by use of a client server system, the cooperative edition work on a common document is implemented.

What is claimed is:

1. A common document editing apparatus, comprising:
   a document storing unit which stores a common document shared by a plurality of users including first and second users;

a lock information managing unit which issues an exclusive edition right permitting editing of the common document in response to a request by the first user, wherein the exclusive edition right is identified by lock information, which is associated with the common document to be edited by the first user;

a lock information storing unit which stores the lock information specifying the issued exclusive edition right and the common document; and an unlocked lock information storing unit;

wherein the lock information managing unit permits overwriting of the common document stored in the document storing unit with the edited common document when the lock information associated with the edited common document is identical to the lock information stored in the lock information storing unit; and wherein the lock information managing unit forcibly cancels the issued exclusive edition right at the request of the second user, transfers the lock information of the forcibly canceled exclusive edition right from the lock information storing unit to the unlocked lock information storing unit, and performs overwriting of the common document with the edited common document in the document storing unit if the lock information associated with the edited common document is identical to the lock information transferred to the unlocked lock information storing unit and if the edited common document is requested to be stored before the second user requests a second exclusive edition right for the common document.

2. The common document editing apparatus according to claim 1, wherein:

the document editing apparatus comprises a server apparatus and a client apparatus operated by a user connected to each other by way of a communication line, the server apparatus comprises the document storing unit, the lock information managing unit, the lock information storing unit and the unlocked lock information storing unit, and the client apparatus comprises a document editing unit for issuing the exclusive edition right request that specifies the common document and for editing the common document supplied from the server apparatus.

3. The common document apparatus according to claim 1, wherein the lock information managing unit forcibly cancels the exclusive edition right issued in response to the request form the second user.

4. A common document editing apparatus, comprising:

a first client computing device requesting an exclusive edition right permitting editing of a common document;

a second client computing device; and a server including:
  a document storing unit which stores the common document;
  a document managing unit coupled to the document storing unit, wherein the document managing unit retrieves the common document from the document storing unit upon receipt of a request from the first client computing device and forwards the common document to the first client computing device;
  a lock information managing unit which issues the exclusive edition right permitting editing of the common document in response to the exclusive edition right request, wherein the issued exclusive edition right is identified by lock information associated with the common document;
  a lock information storing unit coupled to the lock information managing unit, wherein the lock information managing unit stores lock information identifying the issued exclusive edition right associated with the common document in the lock information storing unit; and
  an unlocked lock information storing unit coupled to the lock information storing unit and the lock information managing unit, wherein:
  the lock information managing unit stores the lock information identifying the issued exclusive edition right in the unlocked lock information storing unit when an unlock request is received by the server from the second client computing device; and
  the lock information managing unit deletes the lock information identifying the issued exclusive edition right from the lock information storing unit to cancel the exclusive edition right issued to the first client computing device after the lock information managing unit has stored the lock information in the unlocked lock information storing unit.

5. The common document editing apparatus according to claim 4, wherein the server further comprises a server communication unit coupled to the document managing unit, lock information managing unit, and client computing device.

6. The common document editing apparatus according to claim 4, wherein the client computing device comprises a document editing unit coupled to a client lock information storing unit and client communications unit, which couples to the client computing device to the server.

7. The common document editing apparatus according to claim 4, wherein the first client computing device requests overwriting the common document with the edited common document in the document storing unit, and the lock information managing unit overwrites the common document with the edited common document if the lock information associated with the edited common document is identical to the lock information stored in the unlocked lock information storing unit.

8. The common document editing apparatus according to claim 4, wherein:

the second client computing device requests exclusive edition right of the common document;

the lock information managing unit issues the exclusive edition right to the second user, wherein second lock information is associated with the common document and transferred to the second client computing device;

the lock information managing unit deletes the lock information from the unlocked lock information storing unit; and the lock information managing unit stores the second lock information in the lock information storing unit.

9. The common document editing apparatus according to claim 8, wherein the second client computing device requests overwriting the common document with the edited common document in the document storing unit, and the lock information managing unit overwrites the common document with the edited common document if the second lock information associated with the edited common document is identical to the second lock information stored in the locked information storing unit.

* * * * *